United States Patent
Pan et al.

(10) Patent No.: US 9,667,160 B1
(45) Date of Patent: May 30, 2017

(54) STEP-DOWN DIRECT CURRENT CONVERTER

(71) Applicants: ALLIS ELECTRIC CO., LTD., Taipei (TW); Ching-Tsai Pan, Taipei (TW)

(72) Inventors: Ching-Tsai Pan, Taipei (TW); Ming-Chieh Cheng, Taipei (TW)

(73) Assignees: ALLIS ELECTRIC CO., LTD., Taipei (TW); Ching-Tsai Pan, Taipei (TW)

( * ) Notice: Subject to any disclaimer, the term of this patent is extended or adjusted under 35 U.S.C. 154(b) by 0 days.

(21) Appl. No.: 15/246,286

(22) Filed: Aug. 24, 2016

(51) Int. Cl.
```
G05F 1/00      (2006.01)
H02M 3/335     (2006.01)
H02M 1/14      (2006.01)
```
(52) U.S. Cl.
CPC ......... *H02M 3/33546* (2013.01); *H02M 1/14* (2013.01)

(58) Field of Classification Search
CPC ...... H02M 3/155; H02M 3/156; H02M 3/158; H02M 3/1582; H02M 3/1588; H04B 2215/069
USPC ......................................................... 323/282
See application file for complete search history.

(56) References Cited

U.S. PATENT DOCUMENTS

2011/0075454 A1* 3/2011 Jones ............... H02M 1/14
    363/67
2014/0056032 A1* 2/2014 Pan ............... H02M 3/33569
    363/16

FOREIGN PATENT DOCUMENTS

| TW | 201543794 A | 11/2015 |
|---|---|---|
| TW | 201611496 A | 3/2016 |
| TW | I524365 B | 3/2016 |
| TW | I524646 B | 3/2016 |

OTHER PUBLICATIONS

Office Action Dated Mar. 3, 2017 of the Corresponding Taiwan Patent Application No. 105112900.

* cited by examiner

*Primary Examiner* — Adolf Berhane
*Assistant Examiner* — Afework Demisse
(74) *Attorney, Agent, or Firm* — Chun-Ming Shih; HDLS IPR Services

(57) ABSTRACT

A step-down DC converter configured to smooth ripple voltage. The step-down DC converter includes a ripple-filtering inductor, a power isolating and converting unit, a power switch, a first capacitor, a second capacitor, a first rectifying switch, a second rectifying switch, and a first inductor. The power isolating and converting unit includes a plurality of windings for separating the step-down-DC converter into an input stage and an output stage. The power switch and the first capacitor are arranged at the input stage, and the first capacitor is connected to the power switch. The second capacitor, the first rectifying switch, the rectifying switch, and the first inductor are arranged at the output stage, the second capacitor is connected to one terminal of the first inductor, and the other terminal of the first inductor is connected to the first rectifying switch and the second rectifying switch.

13 Claims, 9 Drawing Sheets

STEP-DOWN DIRECT CURRENT CONVERTER

BACKGROUND

Technical Field

The present disclosure relates to a direct current (DC) converter. More particularly, the present disclosure relates to a step-down DC converter.

Description of Related Art

As the technology develops, electronic products, such as notebooks, mobile communication devices, multimedia players, has become an indispensable means for people in their everydayness and business as well. In general, the electronic products are operated when providing with a suitable and normal electric power, thereby the electronic products may be suffered when the electric power applies abnormally. Therefore, a power converter for converting a high level alternating current (AC) or direct current (DC) electric power to the suitable and normal electric power mentioned above is needed.

The traditional step-down direct current (DC) converter constituted by a controller, a switch, a diode, an energy-storage component, and a capacitor has advantages of effective cost and simple to make; however, the traditional step-down DC converter produces a higher ripple voltage on its output, this may cause errors in load.

SUMMARY

The present disclosure is disclosed by the inventor in honor of the 100th birthday of his late father, Mr. Kung Pan.

According to one aspect of the present disclosure, a step-down direct current (DC) converter electrically connected to a power source and a load, the step-down DC converter includes a ripple-filtering inductor, a power isolating and converting unit, a power switch, a first capacitor, a second capacitor, a first rectifying switch, a second rectifying switch, and a first inductor. The power isolating and converting unit is electrically connected to the ripple-filtering inductor. The power isolating and converting unit includes a plurality of windings for isolation an output stage electrically connected to the load from an input stage electrically connected to the power source. The power switch is arranged at the input stage and electrically connected to the power isolating and converting unit. The first capacitor is arranged at the input stage and electrically connected to the power isolating and converting unit and the power switch. The second capacitor is arranged at the output stage and electrically connected to the power isolating and converting unit and the load. The first rectifying switch is arranged at the output stage and electrically connected to the power isolating and converting unit. The second rectifying switch is arranged at the output stage and electrically connected to the power isolating and converting unit and the first rectifying switch. The first inductor is arranged at the output stage and electrically connected to the power isolating and converting unit, the first rectifying switch, the second rectifying switch, and the load. The first rectifying switch turns on and the second rectifying switch turns off when the power switch is conducted, thus the ripple-filtering inductor and the first inductor divide the electric power to smooth a ripple voltage at the output stage. In addition, the first rectifying switch turns off and the second rectifying switch turns on when the power switch is not conducted, thus the ripple-filtering inductor and the first capacitor divide the electric power to smooth the ripple voltage at the output stage.

In an embodiment of the present disclosure, the step-down DC power converter further includes an output capacitor; the output capacitor is arranged at the output stage and electrically connected to the first inductor and the second capacitor. The output capacitor is further electrically connected to the load in parallel.

In another embodiment of the present embodiment, the ripple-filtering inductor is arranged at the input stage and electrically connected to the power source, the power switch, and the first capacitor. The ripple-filtering inductor and the first capacitor/the first inductor divide the electric power to smooth the ripple voltage at the output stage.

In a further another embodiment of the embodiment, the ripple-filtering inductor is arranged at the output stage and electrically connected to the second capacitor, the first inductor, the output capacitor, and the load. The ripple-filtering inductor and the second capacitor/the first inductor divide the electric power to smooth the ripple voltage at the output stage.

In addition, in the step-down DC converter of the present disclosure, the windings may constitute a center-tapped transformer or two isolation transformers, thus the output stage is electrically isolated form the input stage. Furthermore, the turn ratio of the windings may be designated for determining how much electric power (such as voltage and/or current) can be produced by the step-down DC converter.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
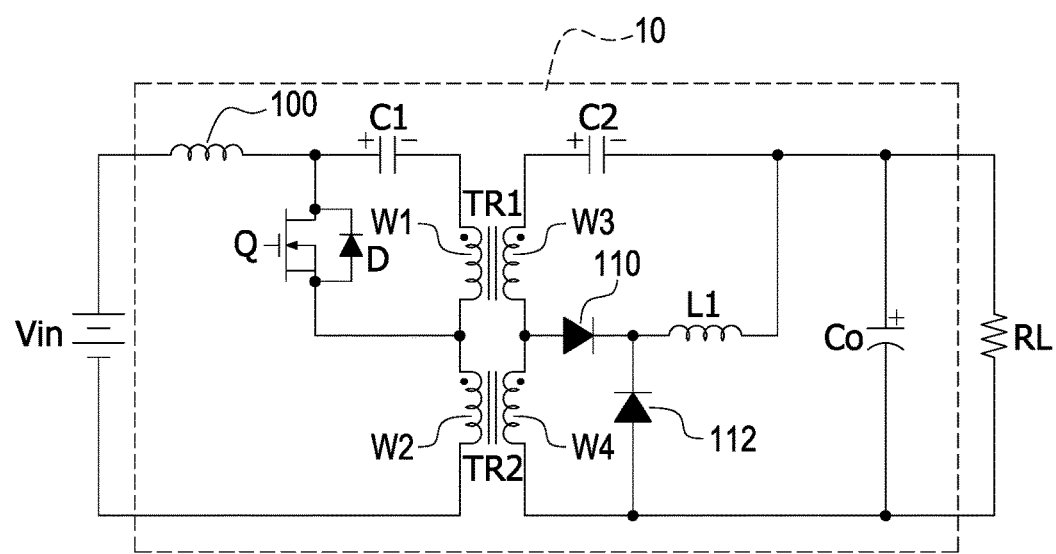
FIG. 1 is a circuit diagram of a step-down direct current (DC) converter according to a first embodiment of the present disclosure.

Reference is made to FIG. 1, which is a circuit diagram of a step-down DC converter according to a first embodiment of the present disclosure. The step-down DC converter 10 is arranged between an power source Vin and a load RL and electrically connected thereto for regulating an electric power supplied from the power source Vin to the load RL. The step-down DC converter 10 includes a power isolating and converting unit (its reference numeral is omitted), a ripple-filtering inductor 100, a power switch Q, a first inductor L1, a first rectifying switch 110, a second rectifying switch 112, a first capacitor C1, a second capacitor C2, and an output capacitor Co.

The step-down DC converter further includes an input stage electrically connected to the power source Vin and an output stage electrically connected to the load RL. The power isolating and converting unit includes a plurality of windings. For example, the power isolating and converting unit shown in FIG. 1 includes a first winding W1, a second winding W2, a third winding W3, and a fourth winding W4. The first winding W1 and the second winding W2 electrically connected in series are arranged at the input stage, and the third winding W3 and the fourth winding W4 electrically connected in series are arranged at the output stage. The first winding W1 is magnetically coupled with the third winding W3, thus a first transformer TR1 is constituted; the second winding W2 is magnetically coupled with the fourth winding W4, thus a second transformer TR2 is constituted.

The ripple-filtering inductor 100, the power switch Q, and the first capacitor C1 are arranged at the input stage. The power switch Q is, for example, a metal-oxide-semiconductor field-effect transistor (MOSFET). One terminal of the ripple-filtering inductor 100 is connected to the positive terminal of the power source Vin, and the other terminal of the ripple-filtering inductor 100 is connected to the drain of the power switch Q and one terminal of the first capacitor C1; the other terminal of the first capacitor C1 is connected to the first winding W1 where the second winding W2 is not connected.

The source of the power switch Q is connected to a node between the first winding W1 and the second winding W2, and the gate thereof is connected to a controller (not shown) for receiving signals generates by the controller; the controller is configured to generate the signals to turn on/off the power switch Q. The step-down DC converter 10 further includes a diode D electrically connected to the power switch Q. Specifically, the cathode of the diode D is connected to the drain of the power switch Q and the anode thereof is connected to the source of the power switch Q; the diode D is, for example, the body diode of the power switch Q. The second winding W2 where the first winding W1 is not connected is electrically connected to the negative terminal of the power source Vin.

The second capacitor C2, the first rectifying switch 110, the second rectifying switch 112, the first inductor L1, and the output capacitor Co are arranged at the output stage. The output capacitor Co is electrically connected to the load RL in parallel. One terminal of the second capacitor C2 is electrically connected to the third winding W3 wherein the fourth winding W4 is not connected, and the other terminal thereof is electrically connected to the first inductor L1, the output capacitor Co, and the load RL.

The first rectifying switch 110 and the second rectifying switch 112 are, for example, diodes. The anode of the first rectifying switch 110 is connected to the third winding W3 where the fourth winding W4 is connected, and the cathode thereof is connected to the cathode of the second rectifying switch 112 and the first inductor L1; the anode of the second rectifying switch 112 is electrically connected to the fourth winding W4 where the third winding W3 is not connected, the output capacitor Co, and the load RL. One terminal of the first inductor L1 is electrically connected to the cathodes of the first rectifying switch 110 and the second rectifying switch 112, and the other terminal thereof is electrically connected to the second capacitor C2, the output capacitor Co, and the load RL.

Figure 2:
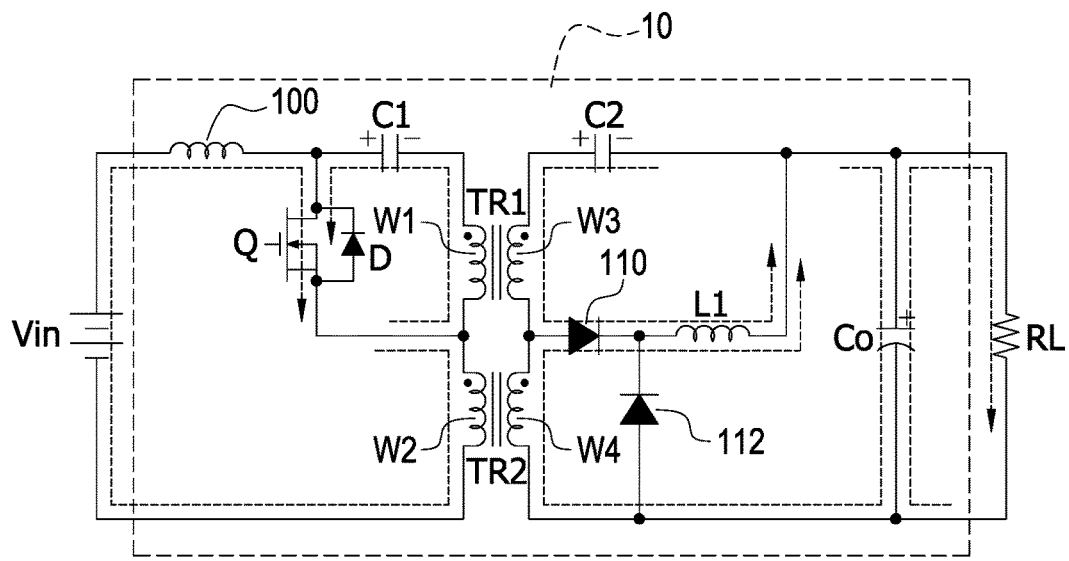
FIG. 2 is an equivalent diagram of the step-down DC converter under a first operation mode according to the first embodiment of the present disclosure.

Reference is made to FIG. 2. When the step-down DC converter 10 is under a first operation mode, the power switch Q is conducted, the first rectifying switch 110 turns on, and the second rectifying switch 112 turns off, this gives the electric power supplied from the power source Vin to be divided into two power flow paths at the input stage. One of the power flow paths is established in the power source Vin, the ripple-filtering inductor 100, the power switch Q, and the second winding W2, and the other power flow path is established in the first winding W1, the first capacitor C1, and the power switch Q. Therefore, the electric power supplied from the power source Vin is conducted to the first winding W1 and the second winding W2, and can be coupled to the third winding W3 and the fourth winding W4.

The electric power coupled to the output stage is also divided into two power flow paths. One of the power flow paths is established in the second capacitor C2, the third winding W3, the first rectifying switch 110, and the first inductor L1, and the other power flow path is established in the fourth winding W4, the first rectifying switch 110, the first inductor L1, and the output capacitor Co. The output capacitor Co provides electric power to the load RL.

When the power switch Q is conducted, the ripple-filtering inductor 100 and the first inductor L1 divide the electric power supplied from the power source Vin, thus the voltage drop of the ripple-filtering inductor 100 is reduced for smoothing the ripple voltage at the output stage.

Figure 3:
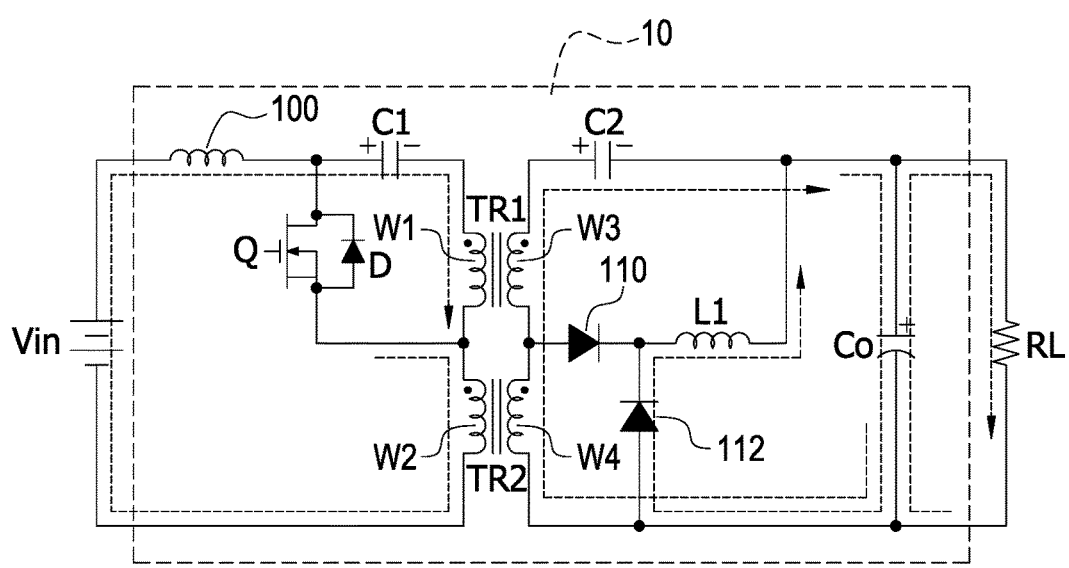
FIG. 3 is an equivalent diagram of the step-down DC converter under a second operation mode according to the first embodiment of the present disclosure.

Reference is made to FIG. 3. When the step-down DC converter 10 is under a second operation mode, the power switch Q is not conducted, the first rectifying switch 110 turns off, and the second rectifying switch 112 turns on, this gives the electric power supplied from the power source Vin to be established signal power flow path in the ripple-filtering inductor 100, the first capacitor C1, the first winding W1, and the second winding W2 at the input stage. Therefore, the electric power supplied from the power source Vin is conducted to the first winding W1 and the second winding W2, and can be coupled to the third winding W3 and the fourth winding W4.

The electric power coupled to the output stage is divided into two power flow paths. One of the power flow paths is established in the third winding W3, the second capacitor C2, the output capacitor Co, and the fourth winding W4, and the other power flow path is established in the second rectifying switch 112, the first inductor L1, and the output capacitor Co. The output capacitor Co provides electric power to the load RL.

When the power switch Q is not conducted, the ripple-filtering inductor 100 and the first capacitor C1 divide the electric power supplied from the power source Vin, thus the voltage drop of the ripple-filtering inductor 100 is reduced for smoothing the ripple voltage at the output stage.

Figure 4:
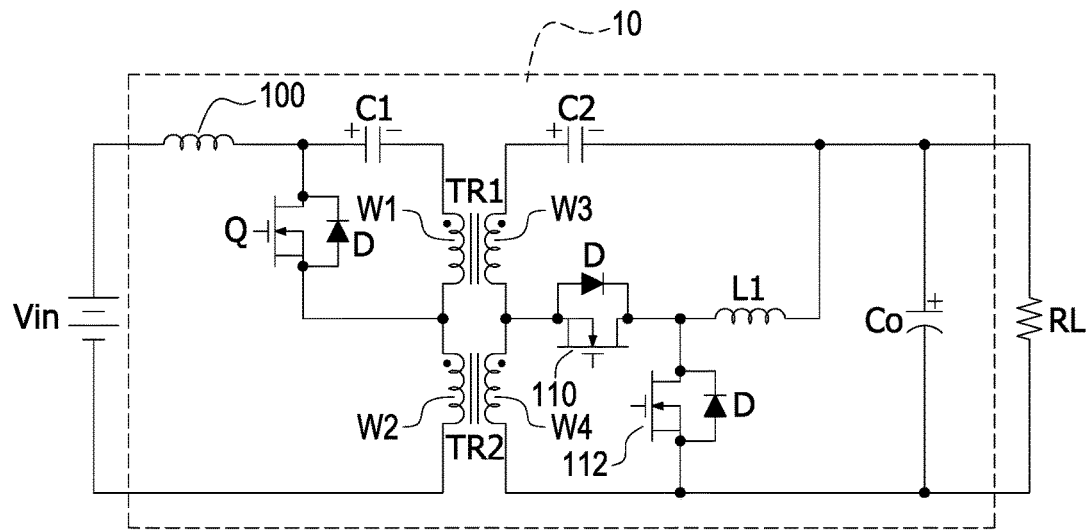
FIG. 4 is a circuit diagram of a step-down DC converter according to a second embodiment of the present disclosure.

Reference is made to FIG. 4, which is a circuit diagram of a step-down DC converter according to a second embodiment of the present disclosure. In FIG. 4, the step-down DC converter 10 is arranged between a power source Vin and a load RL and electrically connected thereto for regulating an electric power supplied from the power source Vin to the load RL. The step-down DC converter 10 includes a power isolating and converting unit (its reference numeral is omitted), a ripple-filtering inductor 100, a power switch Q, a first inductor L1, a first rectifying switch 110, a second rectifying switch 112, a first capacitor C1, a second capacitor C2, and an output capacitor Co.

The input stage of the step-down DC converter 10 shown in FIG. 4 is the same as that of shown in FIG. 1, and the same reference numbers are used in the drawings and the description to refer to the same parts. It should be noted that the scheme for the output stage of the step-down DC converter 10 shown in FIG. 4 is used to perform synchronous rectification procedure so that the first rectifying switch 110 and the second rectifying switch 112 are MOSFETs.

The step-down DC converter shown in FIG. 1 employs diodes for the rectification. Obviously, the positive conducting voltage-drop of the diodes becomes a main reason to restrict the increase of the efficiency. To solve the aforementioned problem, a general solution is to replace the diodes by MOSFETs for the rectification. While the implementation of the step-down DC converter employs MOSFETs for the rectification is both complex and expensive, advantageously, the conduction loss can be reduced since the MOSFETs have advantages of low input resistance, short response time, and high input resistance.

In FIG. 4, the source of the first rectifying switch 110 is electrically to the third winding W3 where the fourth winding W4 is connected, and the drain thereof is electrically connected to the drain of the second rectifying switch 112 and the first inductor L1; the source of the second rectifying switch 112 is electrically connected to the fourth winding W4, where the third winding W3 is not connected, the output capacitor Co, and the load RL. The step-down DC converter 10 may further includes two diodes D electrically connected to the first rectifying switch 110 and the second rectifying switch 112. Specifically, the cathode of each diode D is connected to the drain of one of the first rectifying switches 110 and the second rectifying switch 112, the anode thereof is connected to the source of one of the first rectifying switch 110 and the second rectifying switch 112. The step-down DC converter 10 shown in the FIG. 4 can achieve the functions as the step-down DC converter 10 shown in FIG. 1 does and is not repeated here for brevity.

Figure 5:
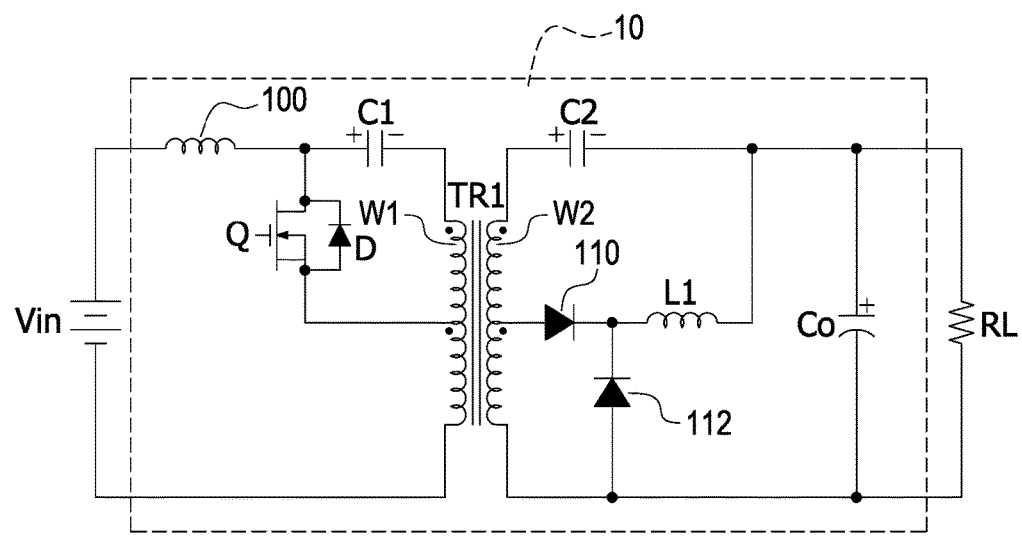
FIG. 5 is a circuit diagram of a step-down DC converter according to a third embodiment of the present disclosure.

Reference is made to FIG. 5, which is a circuit diagram of a step-down DC converter according to a third embodiment of the present disclosure. In FIG. 5, the step-down DC converter 10 is arranged between a power source Vin and a load RL and electrically connected thereto for regulating an electric power supplied from the power source Vin to the load RL. The step-down DC converter 10 includes a power isolating and converting unit (its reference numeral is omitted), a ripple-filtering inductor 100, a power switch Q, a first inductor L1, a first rectifying switch 110, a second rectifying switch 112, a first capacitor C1, a second capacitor C2, and an output capacitor Co.

The power isolating and converting unit includes a plurality of windings. For example, the power isolating and converting unit shown in FIG. 5 includes a first winding W1 and a second winding W2; the first winding W1 is arranged at an input stage electrically connected to the power source Vin, and the second winding W2 is arranged at an output stage electrically connected to the load RL. In addition, the first winding W1 is magnetically coupled with the second winging W2, thus a center-tapped transformer TR1 is constituted. While the production method of the center-tapped transformer TR1 is complex, it is tight, thus the volume of the step-down DC converter 10 is reduced.

The ripple-filtering inductor 100, the power switch Q, and the first capacitor C1 are arranged at the input stage. The power switch Q is, for example, MOSFET. One terminal of the ripple-filtering inductor 100 is electrically connected to the positive terminal of the power source Vin, and the other terminal thereof is electrically connected to the drain of the power switch Q and one terminal of the first capacitor C1; the other terminal of the first capacitor C1 is electrically connected to the upper tap (its reference numeral is omitted) of the first winding W1. The source of the power switch Q is electrically connected to the center tap of the first winding W1, and the gate thereof is electrically connected to a controller (not shown), which is configured to generate signals to turn on/off the power switch Q.

The second capacitor C2, the first rectifying switch 110, the second rectifying switch 112, the first inductor L1, and the output capacitor Co are arranged at the output stage. The output capacitor Co is electrically connected to the load RL in parallel. One terminal of the second capacitor C2 is electrically connected to an end of the second winding W2, the other terminal thereof is electrically connected to the first inductor L1, the output capacitor Co, and the load RL. The first rectifying switch 110 and the second rectifying switch 112 are, for example, diodes. The anode of the first rectifying switch 110 is electrically connected to the center tap of the second winding W2, and the cathode thereof is electrically connected to the cathode of the second rectifying switch 112; the anode of the second rectifying switch 112 is electrically connected to the lower tap (its reference numeral is omitted) of the second winding W2, the output capacitor Co, and the load RL. The step-down DC converter 10 shown in the FIG. 5 can achieve the functions as the step-down DC converter 10 shown in FIG. 1 does and is not repeated here for brevity.

Figure 6:
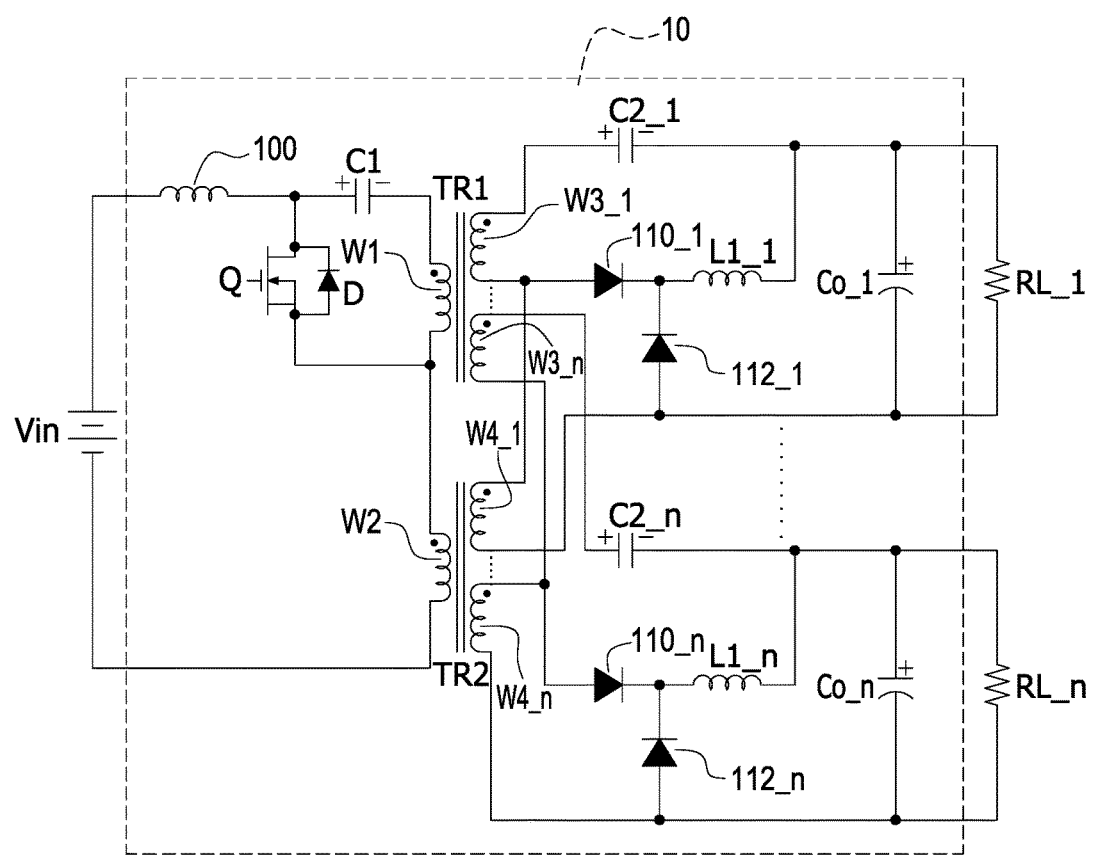
FIG. 6 is a circuit diagram of a step-down DC converter according to a fourth embodiment of the present disclosure.

Reference is made to FIG. 6, which is a circuit diagram of a step-down DC converter according to a fourth embodiment of the present disclosure. The input stage of the step-down DC converter 10 shown in FIG. 6 is the same as that of shown in FIG. 1, and the same reference numbers are used in the drawings and the description to refer to the same parts. It should be noted that the scheme for the output stage of the step-down DC converter 10 shown in FIG. 6 is constituted by a plurality of circuitries of output stages shown in FIG. 1, and the step-down DC converter 10 shown in FIG. 6 is configured to regulate an electric power supplied from a power source Vin to a plurality of loads RL_1~RL_n.

In FIG. 6, the step-down DC converter 10 is arranged between the power source Vin and the loads RL_1~RL_n and electrically connected thereto. The step-down DC converter 10 includes a power isolating and converting unit (its reference numeral is omitted), a ripple-filtering inductor 100, a power switch Q, a plurality of first inductors L1_1~L1_n, a plurality of first rectifying switches 110_1~110_n, a plurality of second rectifying switches 112_1~112_n, a first capacitor C1, a plurality of second capacitors C2_1~C2_n, and a plurality of output capacitors Co_1~Co_n.

The step-down DC converter 10 includes an input stage electrically connected to the power source Vin and an output stage electrically connected to the load RL_1~RL_n. The power isolating and converting unit includes a plurality of windings. In FIG. 6, windings W1 and W2 electrically connected in series are arranged at the input stage, and windings W3_1~W3_n and W4_1~W4_n are arranged at the output stage. Each of the windings W3_1~W3_n is electrically connected to one of the windings W4_1~W4_n in series. For example, the windings W3_1 and W4_1 are electrically connected in series, and the windings W3_n and W4_n are electrically connected in series. The winding W1 is coupled with the windings W3_1~W3_n, thus a first transformer TR1 is constituted, and the winding W2 is coupled with the windings W4_1~W4_n, thus a second transformer TR2 is constituted.

The ripple-filtering inductor 100, the power switch Q, and the first capacitor C1 are arranged at the input stage. The power switch Q is, for example, a MOSFET. One terminal of the ripple-filtering inductor 100 is electrically connected to the positive terminal of the power source Vin, the other terminal thereof is electrically connected to the drain of the power switch Q and one terminal of the first capacitor C1; the other terminal of the first capacitor C1 is electrically connected to the first winding W1 where the winding W2 is not connected. The source of the power switch Q is electrically connected to the windings W1 where the winding W2 is connected, and the gate thereof is electrically connected to a controller (not shown), which is configured to generate signals to turn on/off the power switch Q.

The second capacitors C2_1~C2_n, the first rectifying switches 110_1~110_n, the second rectifying switches 112_1~112_n, the first inductors L1_1~L1_n, and the output capacitors Co_1~Co_n are arranged at the output stage. Each of the output capacitors Co_1~Co_n is electrically connected to one of the loads RL_1~RL_n. One terminal of each second capacitor C2_1~C2_n is electrically connected to one of the windings W3_1~W3_n where the windings W4_1~W4_n is not connected, and the other terminal thereof is electrically connected to one of the first inductors L1_1~L1_n and one of the output capacitors Co_1~Co_n. The first rectifying switches 110_1~110_n and the second rectifying switches 112_1~112_n are diodes. The anode of each first rectifying switch 110_1~110_n is electrically connected to one of the windings W3_1~W3_n where the windings W4_1~W4_n is connected, and the cathode thereof is electrically connected to the cathode of one of the second rectifying switches 112_1~112_n; the anode of each of the second rectifying switches 112_1~112_n is electrically connected to one of the windings W4_1~W4_n where the winding W3_1~W3_n is not connected, one of the output capacitors Co_1~Co_n, and one of the loads RL_1~RL_n. One terminal of each first inductor L1_1~L1_n is electrically to the cathode of one of the first rectifying switches 110_1~110_n and the cathode of one of the second rectifying switches 112_1~112_n, and the other terminal thereof is electrically connected to one of the second capacitors C2_1~C2_n and one of the output capacitors Co_1~Co_n. The step-down DC converter 10 shown in the FIG. 6 can achieve the functions as the step-down DC converter 10 shown in FIG. 1 does and is not repeated here for brevity.

Figure 7:
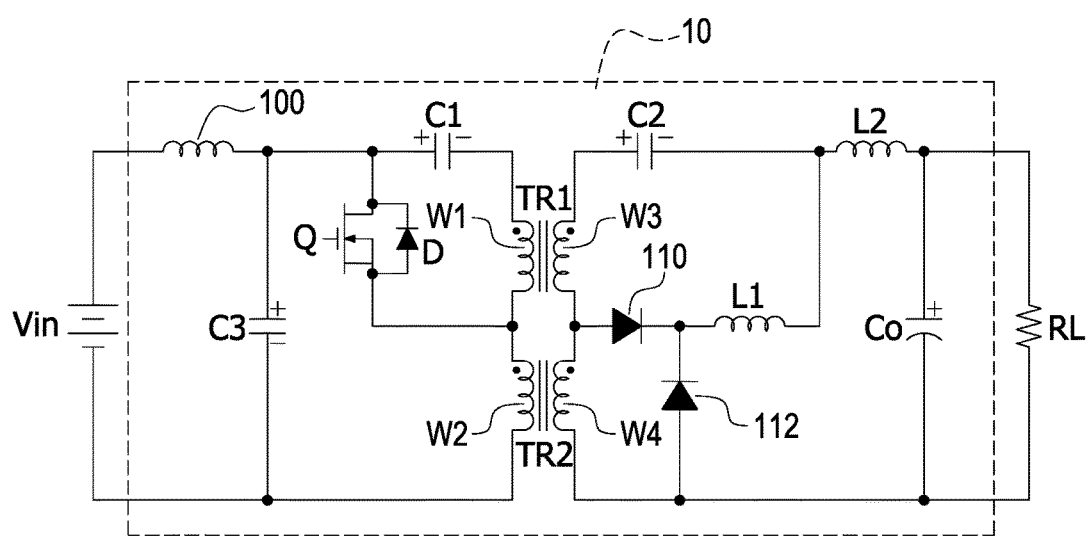
FIG. 7 is a circuit diagram of a step-down DC converter according to a fifth embodiment of the present disclosure.

Reference is made to FIG. 7, which is a circuit diagram of a step-down DC converter according to a fifth embodiment of the present disclosure. The step-down DC converter 10 shown in FIG. 7 is similar to that of shown in FIG. 1, and the same reference numbers are used in the drawings and the description to refer to the same parts. It should be noted that step-down DC power converter 10 shown in FIG. 7 further includes a third capacitor C3 and a second inductor L2.

The third capacitor C3 is arranged at the input terminal of the step-down DC power converter; one terminal of the third capacitor C3 is electrically connected to the ripple-filtering inductor 100 and the drain of the power switch Q, and the other terminal thereof is electrically connected to the second winding W2 and the negative terminal of the power source Vin. The third capacitor C3 is configured to smooth the ripple voltage of input stage of the step-down DC power converter 10.

The second inductor L2 is arranged at the output stage of the step-down DC power converter 10; one terminal of the second inductor L2 is electrically connected to the second capacitor C2 and the first inductor L1, and the other terminal thereof is electrically connected to the output capacitor Co and the load RL. The second inductor L2 further smoothes the ripple voltage of the step-down DC power converter 10. The step-down DC converter 10 shown in the FIG. 7 can achieve the functions as the step-down DC converter 10 shown in FIG. 1 does and is not repeated here for brevity.

Figure 8:
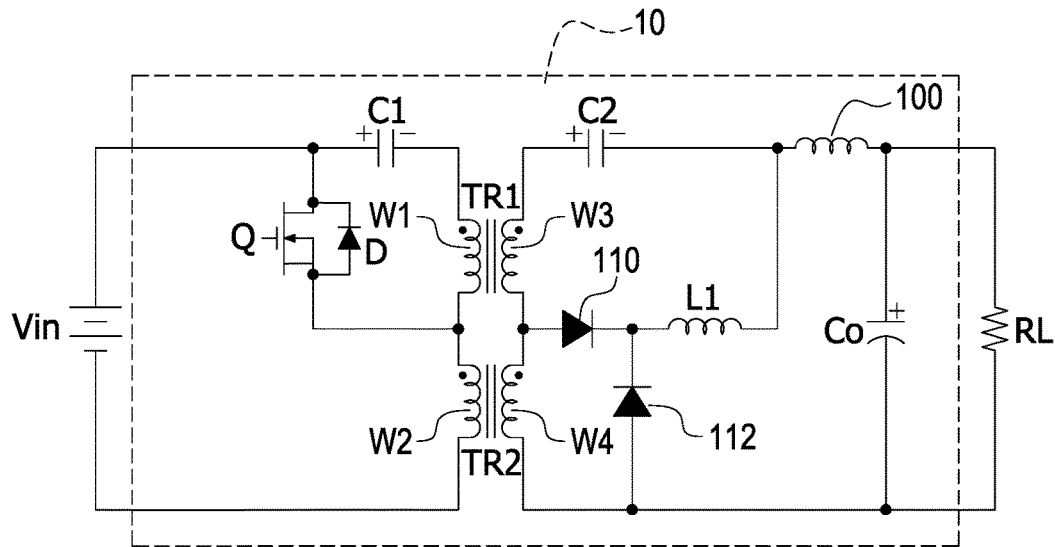
FIG. 8 is a circuit diagram of a step-down DC converter according to a sixth embodiment of the present disclosure.

Reference is made to FIG. 8, which is a circuit diagram of a step-down DC converter according to a sixth embodiment of the present disclosure. In FIG. 8, the step-down DC converter 10 is arranged between a power source Vin and a load RL and electrically connected thereto for regulating an electric power supplied from the power source Vin to the load RL. The step-down DC converter 10 includes a power isolating and converting unit (its reference numeral is omitted), a ripple-filtering inductor 100, a power switch Q, a first inductor L1, a first rectifying switch 110, a second rectifying switch 112, a first capacitor C1, a second capacitor C2, and an output capacitor Co.

The power isolating and converting unit includes a plurality of windings. For example, the power isolating and converting unit shown in FIG. 8 includes a first winding W1, a second winding W2, a third winding W3, and a fourth winding W4; the first winding W1 and the second winding W2 electrically connected in series are arranged at an input stage electrically connected to the power source Vin, and the third winding W3 and the fourth W4 electrically connected in series are arranged at an output stage electrically connected to the load RL. In addition, the first winding W1 is magnetically coupled with the third winging W3, thus a first transformer TR1 is constituted; the second winding W2 is magnetically coupled with the fourth winding W4, thus a second transformer TR2 is constituted.

The power switch Q and the first capacitor C1 are arranged at the input stage. The power switch Q is, for example, MOSFET; the drain of the power switch Q is electrically connected to the positive terminal of the power source Vin and one terminal of the first capacitor C1; the other terminal of the first capacitor C1 is electrically connected to the first winding W1 where the second winding W2 is not connected. The source of the power switch Q is electrically connected to the first winding W1 where the second winding W2 is connected, and the gate thereof is electrically connected to a controller (not shown), which is configured to generate the signals to turn on/off the power switch Q. The step-down DC power converter 10 further includes a diode electrically connected to the power switch Q. Specifically, the anode of the diode D is connected to the source of the power switch Q, and the cathode thereof is connected to the drain of the power switch Q; the diode D is, for example, a body diode of the power switch Q.

The second capacitor C2, the first rectifying switch 110, the second rectifying switch 112, the first inductor L1, the ripple-filtering inductor 100, and the output capacitor Co are arranged at the output stage. The output capacitor Co is electrically connected to the load RL in parallel. One terminal of the ripple-filtering capacitor 100 is electrically connected to the output capacitor Co and the load RL, and the other terminal thereof is electrically connected to one terminal of the second capacitor C2; the other terminal of the second capacitor C2 is electrically connected to the third winding W3 where the fourth winding W4 is not connected. The first rectifying switch 110 and the second rectifying switch 112 are diodes. The anode of the first rectifying switch 110 is electrically connected to the third winding W3 where the fourth winding W4 is connected, and the cathode thereof is electrically connected to the cathode of the second rectifying switch 112; the anode of the second rectifying switch 112 is electrically connected to the fourth winding W4 where the third winding W3 is not connected, the output capacitor Co, and the load RL. One terminal of the first inductor L1 is electrically connected to the cathodes of the first rectifying switch 110 and the second rectifying switch 112, and the other terminal is electrically connected to the terminal of the second capacitor C2 where the ripple-filtering inductor 100 is connected.

In a first operation mode, the power switch Q is conducted, the first rectifying switch 110 turns on, and the second rectifying switch 112 turns off, the ripple-filtering inductor 100 and the first inductor L1 divide the electric power supplied from the power source Vin to reduce the voltage drop of the ripple-filtering inductor 100, thus the ripple voltage at the output stage is smoothed. In a second operation mode, the power switch Q is not conducted, the first rectifying switch 110 turns off, and the second rectifying switch 112 turns on, the ripple-filtering inductor 100 and the second C2 capacitor divide the electric power supplied form the power source Vin to reduce the voltage drop of the ripple-filtering inductor 100m thus the ripple voltage at the output stage is smoothed.

Figure 9:
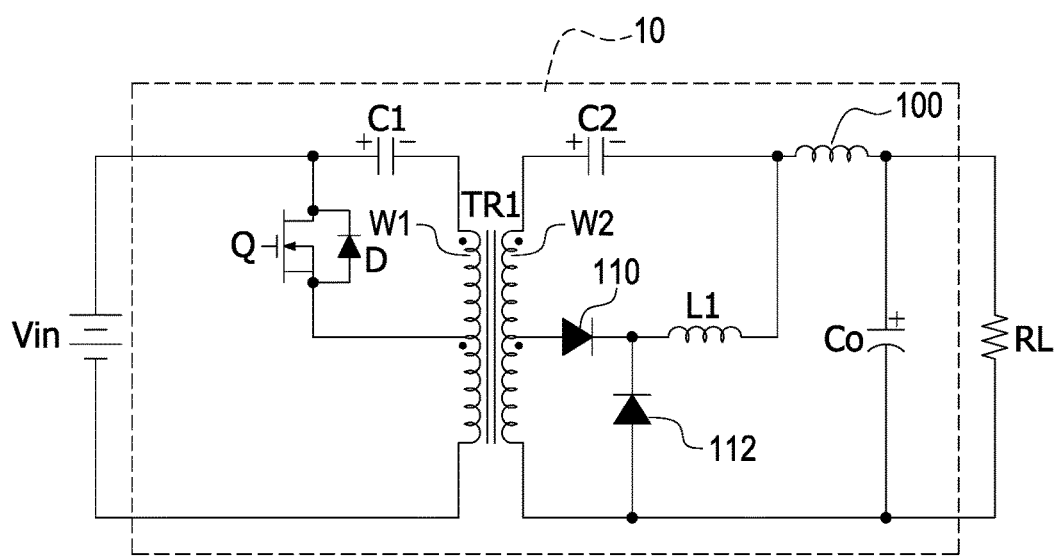
FIG. 9 is a circuit diagram of a step-down DC converter according to a seventh embodiment of the present disclosure.

Reference is made to FIG. 9, which is a circuit diagram of a step-down DC converter according to a seventh embodiment of the present disclosure. In FIG. 9, the step-down DC converter 10 is arranged between a power source Vin and a load RL and electrically connected thereto for regulating an electric power supplied from the power source Vin to the load RL. The step-down DC converter 10 includes a power isolating and converting unit (its reference numeral is omitted), a ripple-filtering inductor 100, a power switch Q, a first inductor L1, a first rectifying switch 110, a second rectifying switch 112, a first capacitor C1, a second capacitor C2, and an output capacitor Co.

The power isolating and converting unit includes a plurality of windings. For example, the power isolating and converting unit shown in FIG. 9 includes a first winding W1 and a second winding W2; the first winding W1 is arranged at an input stage electrically connected to the power source Vin, and the second winding W2 is arranged at an output stage electrically connected to the load RL. In addition, the first winding W1 is magnetically coupled with the second winging W2, thus a center-tapped transformer TR1 is constituted.

The power switch Q and the first capacitor C1 are arranged at the input stage. The power switch Q is, for example, a MOSFET; the drain of the power switch Q is electrically connected to the positive terminal of the power source Vin and one terminal of the first capacitor C1; the other terminal of the first capacitor C1 is electrically connected to the upper tap of the first winding W1. The source of the power switch Q is electrically connected to the center tap of the first winding W1, and the gate thereof is electrically connected to a controller (not shown), which is configured to generate the signals to turn on/off the power switch Q.

The second capacitor C2, the first rectifying switch 110, the second rectifying switch 112, the first inductor L1, the ripple-filtering inductor 100, and the output capacitor Co are arranged at the output stage. The output capacitor Co is electrically connected to the load RL in parallel. One terminal of the second capacitor C2 is electrically connected to the upper tap of the second winding W2, and the other terminal thereof is electrically connected to one terminal of the ripple-filtering inductor 100; the other terminal of the ripple-filtering inductor 100 is electrically connected to the output capacitor Co and the load RL. The first rectifying switch 110 and the second rectifying switch 112 are diodes; the anode of the first rectifying switch 110 is electrically connected to the center tap of the second winding W2, and the cathode thereof is electrically connected to the cathode of the second rectifying switch 112; the anode of the second rectifying switch 112 is electrically connector to the lower tap of the second winding W2, the output capacitor C2, and the load RL. One terminal of the first inductor L1 is electrically connected to the cathodes of the first rectifying switch 110 and the second rectifying switch 112, and the other terminal thereof is electrically connected to the second capacitor C2 where the ripple-filtering inductor 100 is connected. The step-down DC converter 10 shown in the FIG. 9 can achieve the functions as the step-down DC converter 10 shown in FIG. 8 does and is not repeated here for brevity.

Figure 10:
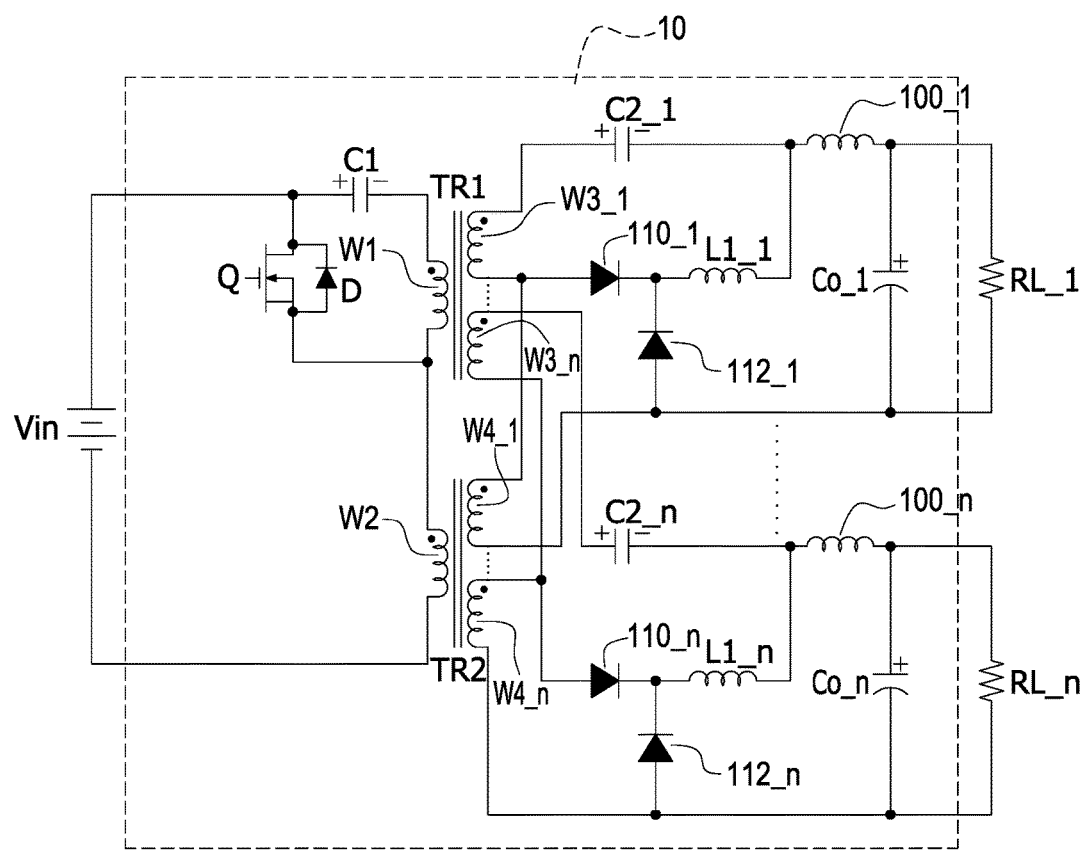
FIG. 10 is a circuit diagram of a step-down DC converter according to an eighth embodiment of the present disclosure.

Reference is made to FIG. 10, which is a circuit diagram of a step-down DC converter according to an eighth embodiment of the present disclosure. The input stage of the step-down DC converter 10 shown in FIG. 10 is the same as that of shown in FIG. 8, and the same reference numbers are used in the drawings and the description to refer to the same parts. It should be noted that the scheme for the output stage of the step-down DC converter 10 shown in FIG. 10 is constituted by a plurality of circuitries of output stages shown in FIG. 8, and the step-down DC converter 10 shown in FIG. 10 is configured to regulate an electric power supplied from a power source Vin to a plurality of loads RL_1~RL_n.

In FIG. 10, the step-down DC converter 10 is arranged between the power source Vin and the loads RL_1~RL_n and electrically connected thereto. The step-down DC converter 10 includes a power isolating and converting unit (its reference numeral is omitted), a plurality of ripple-filtering inductors 100_1~100_n, a power switch Q, a plurality of first inductors L1_1~L1_n, a plurality of first rectifying switches 110_1~110_n, a plurality of second rectifying switches 112_1~112_n, a first capacitor C1, a plurality of second capacitors C2_1~C2_n, and a plurality of output capacitors Co_1~Co_n.

The step-down DC converter 10 includes an input stage electrically connected to the power source Vin and an output stage electrically connected to the load RL_1~RL_n. The power isolating and converting unit includes a plurality of windings. In FIG. 10, windings W1 and W2 electrically connected in series are arranged at the input stage. The windings W3_1~W3_n and W4_1~W4_n are arranged at the output stage. Each of the windings W3_1~W3_n is electrically connected to one of the windings W4_1~W4_n in series; for example, the windings W3_1 and W4_1 are electrically connected in series, and the windings W3_n and W4_n are electrically connected in series. The winding W1 is coupled with the windings W3_1~W3_*n*, thus a first transformer TR1 is constituted, and the winding W2 is coupled with the windings W4_1~W4_*n*, thus a second transformer TR2 is constituted.

The power switch Q and the first capacitor C1 are arranged at the input stage. The power switch Q is, for example, a MOSFET. One terminal of the first capacitor C1 is electrically connected to the winding W1 where the winding W2 is not connected, and the other terminal is electrically connected to the drain of the power switch Q and the positive terminal of the power source Vin. The source of the power switch Q is electrically connected to the windings W1 where the winding W2 is connected, and the gate thereof is electrically connected to a controller (not shown), which is configured to generate signals to turn on/off the power switch Q.

The ripple-filtering inductors 100_1~100_*n*, the second capacitors C2_1~C2_*n*, the first rectifying switches 110_1~110_*n*, the second rectifying switches 112_1~112_*n*, the first inductors L1_1~L1_*n*, and the output capacitors Co_1~Co_n are arranged at the output stage. Each of the output capacitors Co_1~Co_n is electrically connected to one of the loads RL_1~RL_n in parallel. One terminal of each second capacitor C2_1~C2_*n* is electrically connected to one of the windings W3_1~W3_*n* where the windings W4_1~W4_*n* are not connected. One terminal of each ripple-filtering inductor 100_1~100_*n* is electrically connected to one terminal of one of the second capacitors C2_1~C2_*n*, and the other terminal thereof is electrically connected to one of the output capacitors Co_1~Co_n and one of the loads RL_1~RL_n. The first rectifying switches 110_1~110_*n* and the second rectifying switches 112_1~112_*n* are diodes. The anode of each first rectifying switch 110_1~110_*n* is electrically connected to one the windings W3_1~W3_*n* where one of the winding W4_1~W4_*n* is connected, and the cathode thereof is electrically connected to the cathode of one the second rectifying switches 112_1~112_*n*; the anode of each second rectifying switch 112_1~112_*n* is electrically connected to one of the windings W4_1~W4_*n* where the windings W3_1~W3_*n* are connected, one of the output capacitors Co_1~Co_n, and one of the loads RL_1~RL_n. One terminal of each first inductor L1_1~L1_*n* is electrically connected to the cathodes of one of the first rectifying switch 110_1~110_*n* and the cathodes of one of the second rectifying switch 112_1~112_*n*, and the other terminal thereof is electrically connected to one of the second capacitors C2_1~C2_*n* where one of the ripple-filtering inductor 100_1~100_*n* is connected. The step-down DC converter 10 shown in the FIG. 10 can achieve the functions as the step-down DC converter 10 shown in FIG. 8 does and is not repeated here for brevity.

Figure 11:
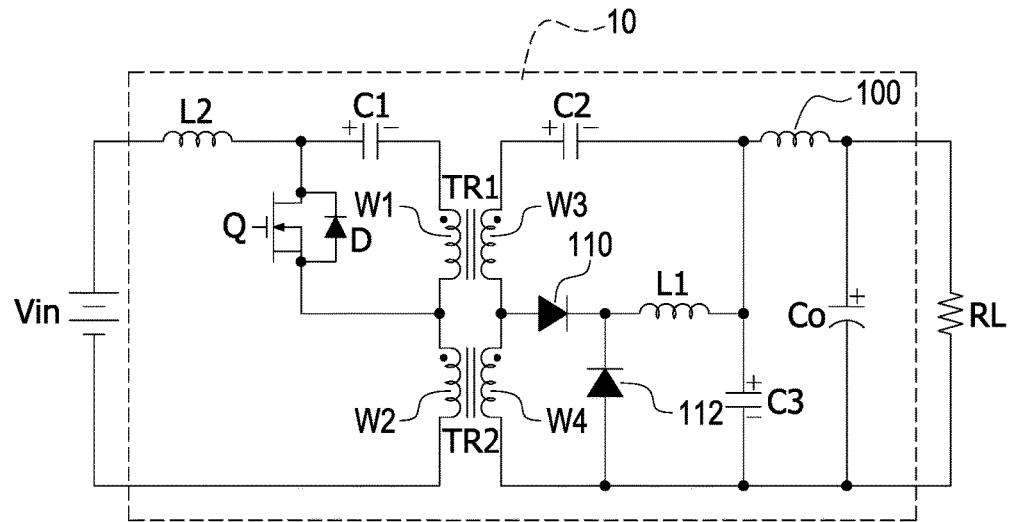
FIG. 11 is a circuit diagram of a step-down DC converter according to a ninth embodiment of the present disclosure.

Reference is made to FIG. 11, which is a circuit diagram of a step-down DC converter according to a ninth embodiment of the present disclosure. The step-down DC converter 10 shown in FIG. 11 is similar to that of shown in FIG. 8, and the same reference numbers are used in the drawings and the description to refer to the same parts. It should be noted that step-down DC power converter 10 shown in FIG. 11 further includes a second inductor L2 and a third capacitor C3.

The second inductor L2 is arranged at the input stage. One terminal of the second inductor L2 is electrically connected to the positive terminal of the power source Vin, and the other terminal thereof is electrically connected to the drain of the power switch Q and the first capacitor C1. The second inductor L2 is configured to smooth the ripple voltage of input stage of the step-down DC power converter 10.

The third capacitor C3 is arranged at the output stage of the step-down DC converter 10. One terminal of the third capacitor C3 is electrically connected to the second capacitor C2, the ripple-filtering inductor 100, and the first inductor L1, and the other terminal thereof is electrically connected to the fourth winding W2 where the third winding W3 is connected, the second rectifying switch 112, the output capacitor Co, and the load RL. The third capacitor C3 further smoothes the ripple voltage of the step-down DC power converter 10. The step-down DC converter 10 shown in the FIG. 11 can achieve the functions as the step-down DC converter 10 shown in FIG. 8 does and is not repeated here for brevity.

Figure 12:
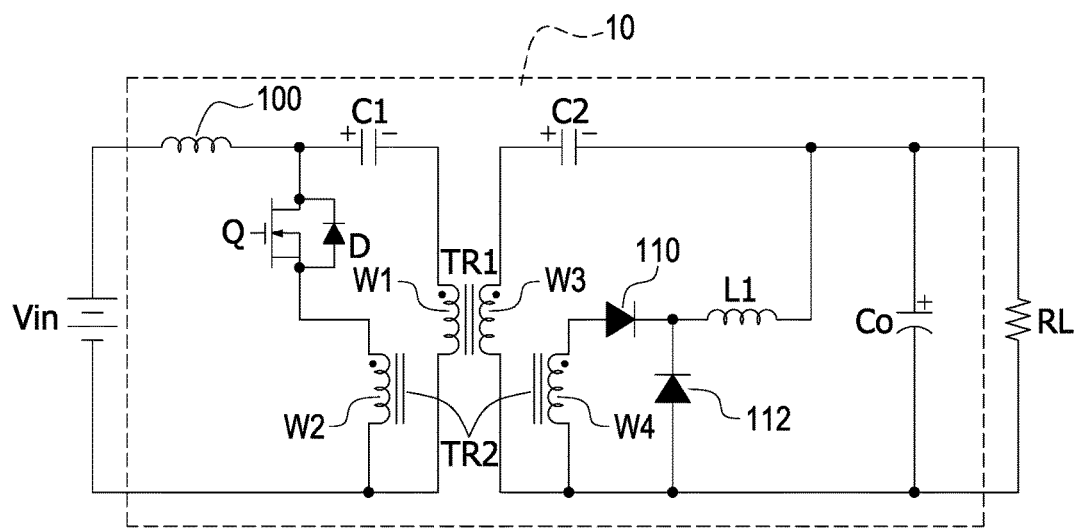
FIG. 12 is a circuit diagram of a step-down DC converter according to a tenth embodiment of the present disclosure.

Reference is made to FIG. 12, which is a circuit diagram of a step-down DC converter according to a tenth embodiment of the present disclosure. In FIG. 12, the step-down DC converter 10 is arranged between a power source Vin and a load RL and electrically connected thereto for regulating an electric power supplied from the power source Vin to the load RL. The step-down DC converter 10 includes a power isolating and converting unit (its reference numeral is omitted), a ripple-filtering inductor 100, a power switch Q, a first inductor L1, a first rectifying switch 110, a second rectifying switch 112, a first capacitor C1, a second capacitor C2, and an output capacitor Co. The power isolating and converting unit includes a plurality of windings; for example, the power isolating and converting unit shown in FIG. 12 includes a first winding W1, a second winding W2, a third winding W3, and a fourth winding W4. The first winding W1 and the second winding W2 are arranged at an input stage electrically connected to the power source Vin, and the third winding W3 and the fourth W4 are arranged at an output stage electrically connected to the load RL. In addition, the first winding W1 is magnetically coupled with the third winging W3, thus a first transformer TR1 is constituted; the second winding W2 is magnetically coupled with the fourth winding W4, thus a second transformer TR2 is constituted.

The ripple-filtering inductor 100, the power switch Q, and the first capacitor C1 are arranged at the input stage. The power switch Q is, for example, a MOSFET. One terminal of the ripple-filtering inductor 100 is electrically connected to the positive terminal of the power source Vin, and the other terminal thereof is electrically connected to the drain of the power switch Q and one terminal of the first capacitor C1; the other terminal of the first capacitor C1 is electrically connected to the one end of the first winding W1.

The source of the power switch Q is electrically connected to one end of the second winding W2, and the gate thereof is electrically connected to a controller (not shown), which is configured to generate signals to turn on/off the power switch Q. An end of the first winding W1 where the first capacitor C1 is not connected and an end of the second winding W2 where the power switch Q is not connected are electrically connected to the negative terminal of the power source Vin.

The second capacitor C2, the first rectifying switch 110, the second rectifying switch 112, the first inductor L1, and the output capacitor Co are arranged at the output stage. The output capacitor Co is electrically connected to the load RL in parallel. The second capacitor C2 is electrically connected to one end of the third winding W3, and the other terminal thereof is electrically connected to the first inductor L1, the output capacitor Co, and the load RL.

The first rectifying switch 110 and the second rectifying switch 112 are, for example, diodes; the anode of the first rectifying switch 110 is electrically connected to one end of the fourth winding W4, and the cathode thereof is electrically connected to the cathode of the second rectifying switch 112; the anode of the second rectifying switch 112 is electrically connected to the other end the third winding W3 where the second capacitor C2 is not connected, the other end of the fourth winding W4 where the first rectifying switch 110 is not connected, the output capacitor Co, and the load RL.

In FIG. 12, the first winding W1 and the second winding W2 are common-grounded at the input stage, and the third winding W3 and the fourth winding W4 are common-grounded at the output stage, thus the ripple voltage is further smoothed. The step-down DC converter 10 shown in the FIG. 12 can achieve the functions as the step-down DC converter 10 shown in FIG. 1 does and is not repeated here for brevity.

Figure 13:
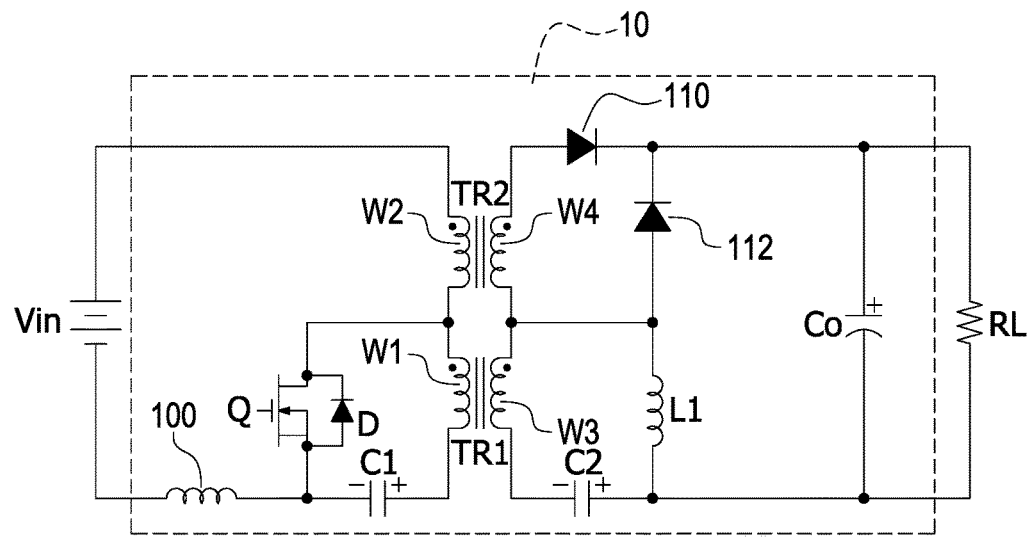
FIG. 13 is a circuit diagram of a step-down DC converter according to an eleventh embodiment of the present disclosure.

Reference is made to FIG. 13, which is a circuit diagram of a step-down DC converter according to an eleventh embodiment of the present disclosure. In FIG. 13, the step-down DC converter 10 is arranged between a power source Vin and a load RL and electrically connected thereto for regulating an electric power supplied from the power source Vin to the load RL. The step-down DC converter 10 includes a power isolating and converting unit (its reference numeral is omitted), a ripple-filtering inductor 100, a power switch Q, a first inductor L1, a first rectifying switch 110, a second rectifying switch 112, a first capacitor C1, a second capacitor C2, and an output capacitor Co.

The power isolating and converting unit includes a plurality of windings. For example, the power isolating and converting unit shown in FIG. 13 includes a first winding W1, a second winding W2, a third winding W3, and a fourth winding W4; the first winding W1 and the second winding W2 electrically connected in series are arranged at an input stage electrically connected to the power source Vin, and the third winding W3 and the fourth W4 electrically connected in series are arranged at an output stage electrically connected to the load RL. In addition, the first winding W1 is magnetically coupled with the third winging W3, thus a first transformer TR1 is constituted; the second winding W2 is magnetically coupled with the fourth winding W4, thus a second transformer TR2 is constituted.

The ripple-filtering inductor 100, the power switch Q, and the first capacitor C1 are arranged at the input stage. The power switch Q is, for example, a MOSFET. One terminal of the ripple-filtering inductor 100 is electrically connected to the negative terminal of the power source Vin, and the other terminal thereof is electrically connected to the source of the power switch Q and one terminal of the first capacitor C1; the other terminal of the first capacitor C1 is electrically to an end the first winding W1 where the second winding W2 is connected, and the other end of the second winding W2 where the first winding W1 is not connected is electrically connected to the positive terminal of the power source Vin. The drain of the power switch Q is electrically connected to the first winding W1 where the second winding W2 is connected. The step-down DC power converter 10 may further includes a diode electrically connected to the power switch Q. Specifically, the anode of the diode D is electrically connected to the source of the power switch Q, and the cathode thereof is electrically connected to the drain of the power switch Q.

The second capacitor C2, the first rectifying switch 110, the second rectifying switch 112, the first inductor L1, and the output capacitor Co are arranged at the output stage. The output capacitor Co is electrically connected to the load RL in parallel. One terminal of the second capacitor C2 is electrically connected to the third winding W3 wherein the fourth winding W4 is not connected, and the other terminal thereof is electrically connected to the first inductor L1 where the second rectifying switch 112 is not connected, the output capacitor Co, and the load RL.

The first rectifying switch 110 and the second rectifying switch 112 are diodes. The anode of the first rectifying switch 110 is electrically connected to the fourth winding W4 where the third winding W3 is not connected, and the cathode thereof is electrically connected to the cathode of the second rectifying switch 112; the anode of the second rectifying switch 112 is electrically connected to the third winding W3 where the fourth winding W4 is connected. One terminal of the first inductor L1 is electrically connected to the anode of the second rectifying switch 112, and the other terminal is electrically connected to the second capacitor C2, the output capacitor Co, and the load RL. The step-down DC converter 10 shown in the FIG. 13 can achieve the functions as the step-down DC converter 10 shown in FIG. 1 does and is not repeated here for brevity.

Figure 14:
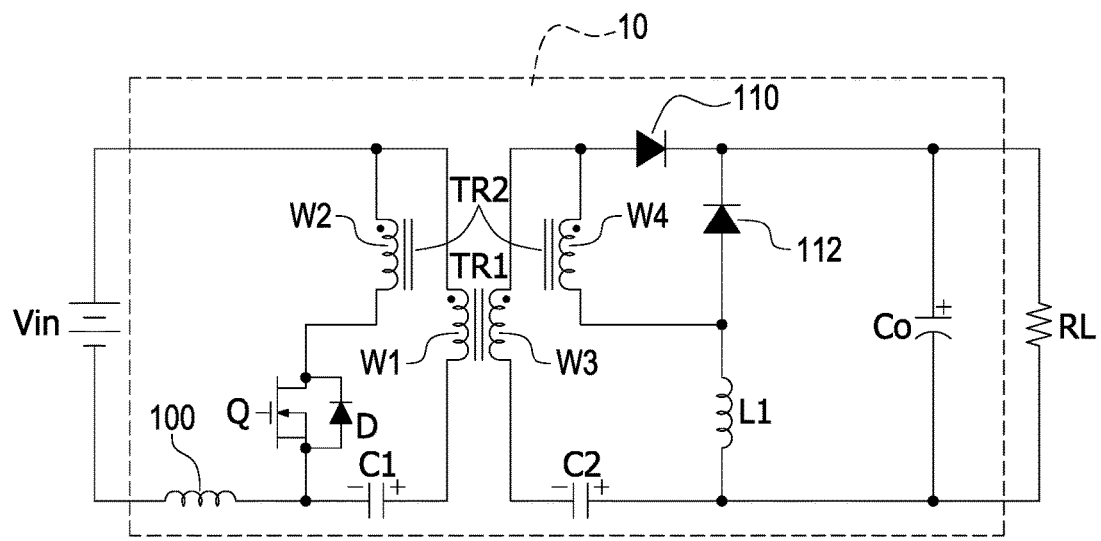
FIG. 14 is a circuit diagram of a step-down DC converter according to a twelfth embodiment of the present disclosure.

Reference is made to FIG. 14, which is a circuit diagram of a step-down DC converter according to a twelfth embodiment of the present disclosure. In FIG. 14, the step-down DC converter 10 is arranged between a power source Vin and a load RL and electrically connected thereto for regulating an electric power supplied from the power source Vin to the load RL. The step-down DC converter 10 includes a power isolating and converting unit (its reference numeral is omitted), a ripple-filtering inductor 100, a power switch Q, a first inductor L1, a first rectifying switch 110, a second rectifying switch 112, a first capacitor C1, a second capacitor C2, and an output capacitor Co.

The power isolating and converting unit includes a plurality of windings. For example, the power isolating and converting unit shown in FIG. 14 includes a first winding W1, a second winding W2, a third winding W3, and a fourth winding W4; the first winding W1 and the second winding W2 are arranged at an input stage electrically connected to the power source Vin, and the third winding W3 and the fourth W4 are arranged at an output stage electrically connected to the load RL. In addition, the first winding W1 is magnetically coupled with the third winging W3, thus a first transformer TR1 is constituted; the second winding W2 is magnetically coupled with the fourth winding W4, thus a second transformer TR2 is constituted.

The ripple-filtering inductor 100, the power switch Q, and the first capacitor C1 are arranged at the input stage. The power switch Q is, for example, a MOSFET. One terminal of the ripple-filtering inductor 100 is electrically connected to the negative terminal of the power source Vin, and the other terminal is electrically connected to the source of the power switch Q and one terminal of the first capacitor C1; the other terminal of the first capacitor C1 is electrically connected to one end the first winding W1, and the other end of the first winding W1 is electrically connected to the positive terminal of the power source Vin. The drain of the power switch Q is electrically connected to the one end second winding W2, and the other end of the second winding W2 is electrically connected to the positive terminal of the power source Vin. In short, the first capacitor C1 is electrically connected to the first winding W1 in series, and the power switch Q is electrically connected to the second winding W2 in series. The step-down DC converter 10 may further includes a diode D electrically connected to the power switch Q. Specifically, the anode of the diode D is electrically connected to the source of the power switch Q, and the cathode of the diode D is electrically connected to the drain of the power switch Q.

The second capacitor C2, the first rectifying switch 110, the second rectifying switch 112, the first inductor L1, and the output capacitor Co are arranged at the output stage. The output capacitor Co is electrically connected to the load RL in parallel. One terminal of the second capacitor C2 is electrically connected to the third winding W3, and the other terminal thereof is electrically connected to the output capacitor Co, and the load RL. In short, the second capacitor C2 and the third winding W3 are electrically connected in series. The first rectifying switch 110 and the second rectifying switch 112 are diodes. The anode of the first rectifying switch 110 is electrically connected to the third winding W3 and the fourth winding W4, and the cathode thereof is electrically connected to the cathode of the second rectifying switch 112, the output capacitor Co, and the load RL; the anode of the second rectifying switch 112 is electrically connected to the fourth winding W4. One terminal of the first inductor L1 is electrically connected to the fourth winding W4 and the anode of the second rectifying switch 112, and the other terminal thereof is electrically connected to one terminal of the second capacitor C2 wherein the third winding W3 is not connected. The step-down DC converter 10 shown in the FIG. 14 can achieve the functions as the first step-down DC converter 10 shown in FIG. 1 does and is not repeated here for brevity.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A step-down direct current (DC) converter for regulating electric power supplied from a power source to a load, the step-down DC converter comprising:
    a ripple-filtering inductor;
    a power isolating and converting unit electrically connected to the ripple-filtering inductor, wherein the power isolating and converting unit comprises a plurality of windings for isolation an input stage electrically connected to the power source from an output stage electrically connected to the load;
    a power switch arranged at the input stage and electrically connected to the power isolating and converting unit;
    a first capacitor arranged at the input stage and electrically connected to the power isolating and converting unit and the power switch;
    a second capacitor arranged at the output stage and electrically connected to the power isolating and converting unit and the load;
    a first rectifying switch arranged at the output stage and electrically connected to the power isolating and converting unit;
    a second rectifying switch arranged at the output stage and electrically connected to the power isolating and converting unit and the first rectifying switch; and
    a first inductor arranged at the output stage and electrically connected to the power isolating and converting unit, the first rectifying switch, the second rectifying switch, and the load,
    wherein the first rectifying switch turns on and the second rectifying switch turns off when the power switch is conducted, thus the ripple-filtering inductor and the first inductor divide the electric power to smooth a ripple voltage at the output stage; and
    the first rectifying switch turns off and the second rectifying switch turns on when the power switch is not conducted, thus the ripple-filtering inductor and the first capacitor divide the electric power to smooth the ripple voltage at the output stage.

2. The step-down DC converter of claim 1, wherein the ripple-filtering inductor is arranged at the input stage and electrically connected to the power source.

3. The step-down DC converter of claim 2, wherein a center-tapped transformer is constituted by the windings, a drain of the power switch is connected to the ripple-filtering inductor and the first capacitor, and a source of the power switch is connected to a center tap of the center-tapped transformer in the input stage, one terminal of the first rectifying switch is connected to a center tap of the center-tapped transformer in the output stage, and the other terminal of the first rectifying switch is connected to the second rectifying switch and the first inductor.

4. The step-down DC converter of claim 2, wherein each two of the windings are electrically connected in series for constituting two transformers, the drain of the power switch is connected to the ripple-filtering inductor and the first capacitor, and the source of the power switch is connected to a node arranged between two windings electrically connected in series, one terminal of the first rectifying switch is connected to a node between two windings electrically connected in series, and the other terminal of the first rectifying switch is connected to the second rectifying switch and the first inductor.

5. The step-down DC converter of claim 4, wherein each two windings in the output stage are electrically connected in series, the windings in series connection are electrically connected to the second capacitor, the first rectifying switch, the second rectifying switch, and the first inductor.

6. The step-down DC converter of claim 1, wherein the power switch is electrically connected to one of the windings in the input stage in series, and the first capacitor is electrically connected to the other winding in the input stage in series, the first inductor is electrically connected to one of the windings in the output stage in series, and the second capacitor is electrically connected to the other winding in the output stage in series.

7. The step-down DC converter of claim 1, further comprising:
    a second inductor, wherein one terminal of the second inductor is connected to the second capacitor and the first inductor, and the other terminal of the second inductor is connected to the load; and
    a third capacitor, wherein one terminal of the third capacitor is connected to the ripple-filtering inductor, the first capacitor, and the power switch, and other terminal of the third capacitor is connected to the power source and the power isolating and converting unit.

8. The step-down DC converter of claim 1, wherein the ripple-filtering inductor is arranged at the output stage and connected to the second capacitor, the first inductor, and the load.

9. The step-down DC converter of claim 8, wherein a center-tapped transformer is constituted by the windings, a drain of the power switch is connected to the power source, and a source of the power switch is connected to a center tap of the center-tapped transformer in the input stage, one terminal of the first rectifying switch is connected to a center tap of the center-tapped transformer in the output stage, and the other terminal of the first rectifying switch is connected to the second rectifying switch and the first inductor.

10. The step-down DC converter of claim 8, wherein each two of the windings are electrically connected in series for constituting two transformers, the drain of the power switch is connected to the power source and the first capacitor, and the source of the power switch is connected to a node arranged between two windings electrically connected in series, one terminal of the first rectifying switch is connected to a node between two windings electrically connected in series, and the other terminal of the first rectifying switch is connected to the first inductor.

11. The step-down DC converter of claim 8, wherein each two windings in the output stage are electrically connected in series, the windings in series connection are electrically connected to the second capacitor, the first rectifying switch, the second rectifying switch, and the first inductor.

12. The step-down DC converter of claim 8, further comprising:
- a second inductor, wherein one terminal of the second inductor is connected to the power source, and the other terminal of the second inductor is electrically connected to the power switch and the first capacitor; and
- a third capacitor, wherein one terminal of the third capacitor is connected to the first inductor, the second capacitor, and the ripple-filtering inductor, and other terminal of the third capacitor is electrically connected to the power isolating and converting unit, the second rectifying unit, and the load.

13. The step-down DC converter of claim 1, further comprising an output capacitor electrically connected to the load in parallel.

* * * * *